UNITED STATES PATENT OFFICE.

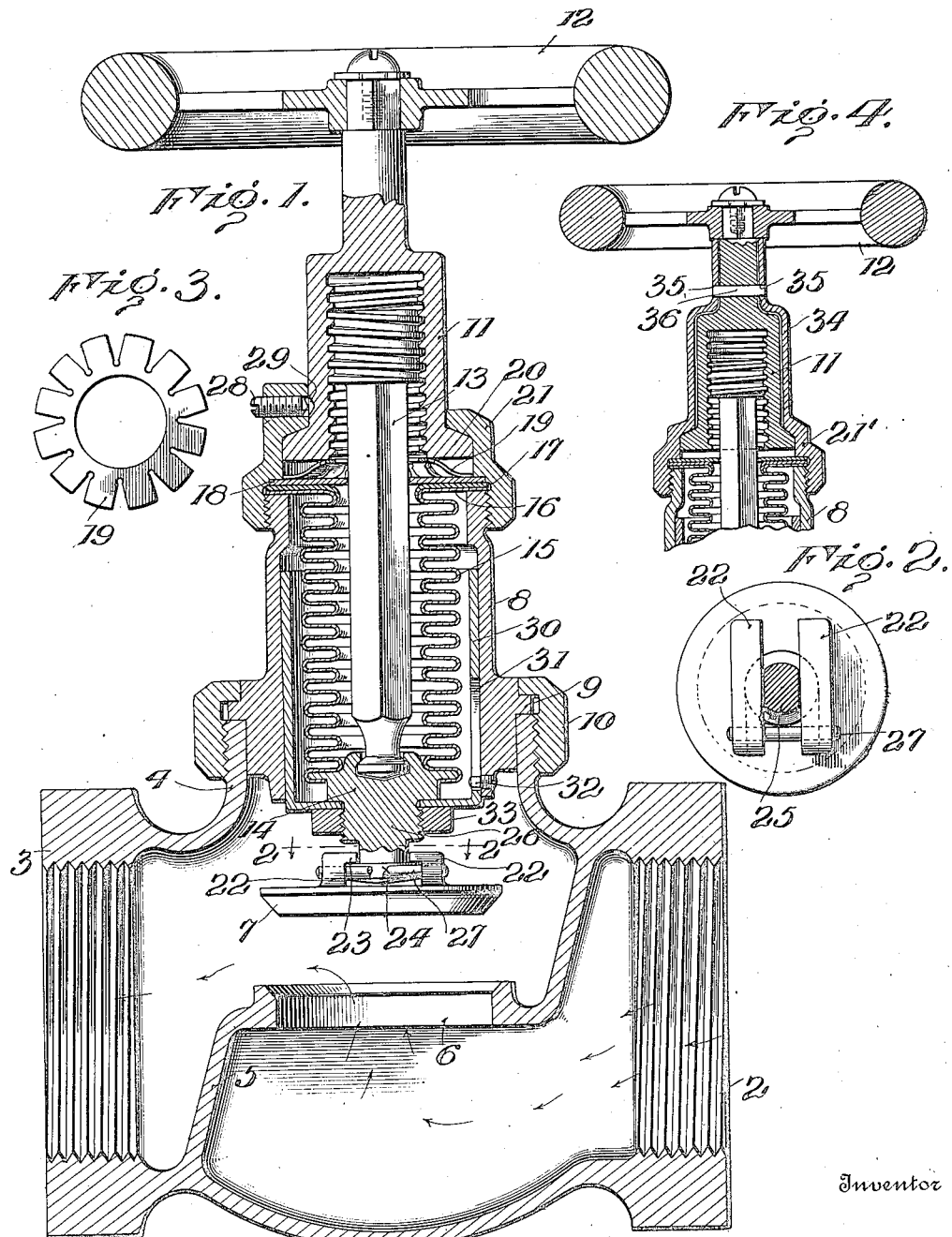

WESTON M. FULTON, OF KNOXVILLE, TENNESSEE, ASSIGNOR TO THE FULTON COMPANY OF KNOXVILLE, TENNESSEE, A CORPORATION OF MAINE.

VALVE.

1,289,434.  Specification of Letters Patent.  Patented Dec. 31, 1918.

Application filed May 29, 1916. Serial No. 100,642.

*To all whom it may concern:*

Be it known that I, WESTON M. FULTON, a citizen of the United States of America, and a resident of Knoxville, Tennessee, have invented a new and useful Improvement in Valves, which invention is fully set forth in the following specification.

This invention relates to valves, and has for its object to provide a valve of the packless type, or one in which the packing for the valve stem is replaced by a flexible wall, with means for permitting regrinding of the valve disk on its seat without disturbing the flexible wall or disconnecting the valve casing from its pipe connections.

As heretofore constructed, hand-operated valves employing a flexible wall around the valve stem for preventing leaks present disadvantages when the valve disk requires regrinding. The mechanical construction of these valves is such that they are not readily taken apart. They have been assembled tightly with a view to preventing leaks and to avoid the disadvantages of repacking. To attempt to regrind the valve disk without disconnecting the assembled parts has resulted in subjecting the flexible wall, which for ordinary valves is thin, to torsional strains which have injured the flexible wall and defeated its purpose.

My invention overcomes the above objections and resides in providing a valve of the type above referred to with means for locking the flexible wall and the valve-operating member against relative movement, thereby enabling turning movement of the valve disk on its seat without danger of twisting and injuring the flexible wall. Grinding can also be effected without disturbing the assembled parts of the valve and without removal of the valve from its connections.

This improvement may be embodied in a variety of mechanical expressions, two of which are herein described in detail by way of example and are illustrated on the accompanying drawings, which are intended to assist the description and are not intended to define the limits of the invention.

Figure 1 is a view in longitudinal vertical section showing a valve embodying my improvement.

Figs. 2 and 3 are detail views, and

Fig. 4 is a view in vertical section showing a modification of my invention.

Referring to the drawings, Fig. 1 shows a globe valve in which 1 is the valve casing having a threaded inlet connection 2 and a corresponding outlet 3, and having an externally threaded side extension 4. A partition wall 5 between the inlet and outlet is provided with a valve-controlled opening or port 6 in alinement with the opening of said side extension. The valve 7 and its associated elements are supported on a bonnet 8 which is secured to the extension in any suitable manner, such as by means of a ledge 9 resting on the end of the extension 4 and held in place by an annular ring nut 10 engaging the threads on the extension 4. The valve stem consists of two parts, an interiorly threaded cylindrical stem portion 11 preferably having a left-hand thread and provided with hand-operated means for rotating it, such as a wheel 12, and a part 13 having a threaded engagement with its companion member. To the lower end of the stem 13 is connected the end closure 14 of a flexible corrugated cylindrical wall 15 which constitutes the leak-preventing septum or member. The upper end of this wall is provided with a flanged portion 16 adapted to rest on the upper edge of the bonnet 8 and which is preferably reinforced by an extra flange 17 as described and claimed in my U. S. Patent No. 1,167,895, dated January 11, 1916. A guide plate 18 having a rectangular opening receives the squared portion of the stem 13 to prevent the latter from rotating when the upper stem 11 is rotated, and also serves as a support for a spring disk 19, see Fig. 3, which yieldingly presses a flanged portion 20 on the stem 11 against a clamping nut 21 which engages the externally-threaded end of the bonnet 8. This nut is also adapted to clamp between itself and the end of the bonnet the flanged end of the flexible corrugated wall and the associated extra flange 17 and guide plate 18, thereby making a tight joint.

The valve 7 may be connected with the end closure 14 in any suitable manner which will permit it to be detachably connected thereto and prevent its rotation with respect thereto. In the drawings the valve disk is provided with parallel bosses 22. For a part of their length the inner walls of these bosses are undercut to form retaining ledges 23 for engaging a head 24 formed on a neck 25 extending from a projection 26 on the end closure 14. This neck is provided with parallel sides which enter the slot formed by the bosses and prevent the disk from turning on its support. A pin 27 passes through the bosses and retains the disk as shown.

To enable the valve disk to be reground without disturbing the assembled parts or twisting the flexible corrugated wall, I provide means for locking the valve stem and flexible wall against relative angular displacement during regrinding. To this end I preferably provide a set screw 28 adapted to engage in a depression 29 in the side of the valve stem 11, thus locking the rotary part of the valve stem to the bonnet 8, and provide the movable end of the tubular flexible wall 15 with a guide for confining the movements of the tubular wall to a rectilinear path. For this purpose I preferably employ a cup-shaped member or shield 30 adapted to telescope within the bonnet 8 and provided with a slot 31 engaging a pin 32 on the bonnet. This cup member is secured to the closure 26 by a nut 33, and serves both as a closure against the action of fluid streams eroding the thin walls of the leak-preventing septum and as a means for holding the latter against twisting when the valve disk is reground on its seat.

The device thus far described operates in the following manner: Assume the parts have been assembled and the valve is located in a pipe system. By reason of wear during use, the valve 7 requires regrinding. Without removing the valve from the pipe system, ring nut 10 is first slightly loosened. Hand wheel 12 is given a right-hand turn to seat valve 7, and set-screw 28 is run into its socket 29. The rotatable valve-operating member 11 is now held against rotation with respect to the bonnet 8. Ring nut 10 is now disengaged and the assembled valve parts are removed. An abrasive mixture, such as oil and emery, is applied to the valve 7 and valve seat, and the valve replaced and ground to properly fit its seat, after which the valve and its seat are cleaned from all grit and the parts secured in position by ring nut 10. During the operation of regrinding it will be noted that rotary movement of the hand wheel is transmitted to the valve disk 7 through nut 21, made fast to stem 11 by set screw 28, and through bonnet 8 and its connection with the valve disk through the cup-shield 30 and the end closure of the flexible corrugated wall, which corrugated wall is entirely relieved from twisting strains.

In Fig. 4 I have shown a slight modification of the manner of locking the rotatable valve-operating member to the bonnet. In this modification a clamp nut 21' is provided with an extension 34 on which rests the hub of the hand wheel 12. This extension is provided with oppositely disposed openings 35 which are adapted to register with an opening 36 in the rotatable valve stem 11. When it is desired to lock the stem to the bonnet, the opening in the stem is turned into registry with the openings in the extension and a pin is inserted. In this modified construction the spring disk 19 appearing in Fig. 1 is omitted, since the valve stem is supported on the upper end of the extension 34. In other respects the construction is the same as that first described, and operates in the same manner.

What is claimed is:—

1. In combination, a valve casing having a valve-seat port, a valve for controlling the same, a tubular flexible wall having connection with said valve, a bonnet member for housing said flexible wall detachably connected with said casing, rotatable means for moving said valve to open and close said port, means for rotating the same, and means for locking said rotatable means and said flexible wall against angular displacement with respect to each other.

2. In combination, a valve casing, a bonnet detachably secured thereto, a partition in said casing having a valve-seat port in axial alinement with the axis of the bonnet, a flexible corrugated tubular wall having one end secured to the bonnet and having its opposite end movable and provided with a closure, a valve mounted on said closure and adapted to open and close said port, rotatable means for operating said valve, means for rotating the same, and means for locking said rotatable means and said tubular wall against angular displacement relatively to each other.

3. In combination, a valve casing having a valve-seat port, a bonnet detachably connected to said casing, a collapsible and extensible corrugated wall, means for securing one end of said wall to said bonnet, a closure for the opposite end of said wall, a valve adapted to open and close said port and connected to said closure, a two-part valve-operating stem consisting of a rotatable member held in position on said bonnet and a reciprocating member having a threaded engagement with said rotatable member, means for locking said rotatable member to said bonnet, and means for holding said corrugated wall against angular displacement with respect to said bonnet.

4. In combination, a valve casing having a valve-seat port, a bonnet detachably connected to said casing, a flexible corrugated wall having one end secured to said bonnet and its opposite end movable and provided with a closure, a valve mounted on said closure and adapted to open and close said port, a cup shield secured to said closure and sliding in said bonnet, means restraining said shield from rotary movement in relation to the bonnet, rotatable means for operating said valve, and means for locking said means against angular movement with respect to said flexible wall.

5. In combination, a valve casing having a valve-seat port, a bonnet detachably connected to said casing the axis of which is in alinement with said port, a flexible corrugated tubular wall having one end secured to said bonnet and having its opposite end movable and provided with a closure, a valve connected to said closure for controlling said port, rotatable means adapted to move the valve into and out of seating position, means restricting the movements of said closure and corrugated wall to a rectilinear path, and means for locking said rotatable means against rotation with respect to said bonnet.

6. In combination, a valve casing having a valve-seat port, a bonnet detachably connected to said casing, a collapsible and extensible tubular wall having at one end a closure to which a valve is attached to control said port and at its opposite end a flange portion adapted to be supported by the bonnet, a plate having a rectangular opening, a clamp-nut for securing the edges of said plate and flange to said bonnet, a two-part valve stem for operating said valve consisting of a rotatable member held in yielding engagement with said clamp-nut and a rectangular reciprocating member working through said rectangular opening and having a threaded engagement with said rotatable member, said reciprocating member being connected to said end closure, means for locking said rotatable member to said bonnet, and means confining the movements of said end closure and tubular wall to a rectilinear path.

7. In combination, a valve casing having a valve-seat port, a bonnet detachably connected to said casing, a collapsible and extensible tubular wall having at one end a closure to which a valve is attached to control said port and at its opposite end a flange portion adapted to be supported by the bonnet, a plate having a rectangular opening, a clamp-nut for securing the edges of said plate and flange to said bonnet, a two-part valve stem for operating said valve consisting of a rotatable member held in yielding engagement with said clamp-nut and a rectangular reciprocating member working through said rectangular opening and having a threaded engagement with said rotatable member, said reciprocating member being connected to said end closure, means for locking said rotatable member to said bonnet, and a cup shield secured to said closure and sliding in said bonnet, said cup-shield having a slot and pin engagement with said bonnet to confine the movement of said end closure and tubular wall to a rectilinear path.

8. In combination, a valve casing having a valve-seat port, a valve for controlling the same, a bonnet detachably connected to said casing, a flexible wall connected to said bonnet and valve, rotatable means for moving said valve to open and close said port, means for rotating the same, and means for locking said valve, rotatable means and bonnet against angular movement with respect to each other.

9. In combination, a valve casing having a valve-seat port, a valve for controlling the same, a bonnet detachably connected to said casing, a flexible tubular wall connected to said bonnet and valve, rotatable means for moving said valve to open and close said port, means for rotating the same, and means for locking said rotatable means and said bonnet against angular movement with respect to each other.

10. In combination, a valve casing having a valve-seat port, a bonnet detachably connected to said casing, a flexible wall connected to said bonnet, a valve carried by said flexible wall and adapted to open and close said port, a two-part valve-operating stem consisting of a rotatable member and a reciprocating member having a threaded engagement with said rotatable member and operatively connected to said valve, and means for locking said rotatable member to said bonnet.

11. In combination, a valve casing having a valve-seat port, a bonnet detachably connected to said casing, a tubular flexible wall connected to said bonnet and provided with a movable end closure, a valve carried by said end closure and adapted to open and close said port, a two-part valve-operating stem consisting of a rotatable member and a reciprocating member having a threaded engagement with said rotatable member and operatively connected to said end closure, means for holding said tubular wall against rotary movement with respect to said bonnet, and means for locking said rotatable member to said bonnet.

12. In combination, a valve casing having a valve-seat port, a bonnet detachably connected to said casing, a tubular flexible wall connected to said bonnet and provided with a movable end closure, a valve carried by said end closure and adapted to open and close said port, a two-part valve-operating stem consisting of a rotatable member and a reciprocating member having a threaded engagement with said rotatable member and operatively connected to said end closure, a rectilineally movable member carried by said end closure and sliding in said bonnet, means for preventing relative rotary movement of said rectilineally movable member and bonnet, and means for locking said rotatable member to said bonnet.

13. In combination, a valve casing having a valve-seat port, a bonnet detachably connected to said casing, a tubular flexible wall connected to said bonnet and provided with a movable end closure, a valve carried by said end closure, means for operating said valve to open and close said port, a cup-shaped shield carried by said end closure and sliding in said bonnet, and means to prevent relative rotary movement of said shield and bonnet.

In testimony whereof I have signed this specification.

WESTON M. FULTON.